United States Patent
Nedelman (10) Patent No.: US 9,630,562 B2
(45) Date of Patent: Apr. 25, 2017

(54) MULTI-FUNCTION AUTOMOTIVE TRUNK STORAGE DRAWER

(71) Applicant: Ford Global Technologies, LLC, Dearborn, MI (US)

(72) Inventor: Marc David Nedelman, Waterford, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/015,720

(22) Filed: Feb. 4, 2016

(65) Prior Publication Data

US 2016/0152189 A1 Jun. 2, 2016

Related U.S. Application Data

(62) Division of application No. 14/160,662, filed on Jan. 22, 2014, now Pat. No. 9,321,402.

(51) Int. Cl.
| | |
|---|---|
| *B60R 9/04* | (2006.01) |
| *B60R 7/02* | (2006.01) |
| *B60R 11/06* | (2006.01) |

(52) U.S. Cl.
CPC ............. *B60R 7/02* (2013.01); *B60R 11/06* (2013.01)

(58) Field of Classification Search
CPC ............. F25D 25/025; F25D 2323/121; F25D 2323/122; F25D 23/021; F25D 23/126; Y10S 292/31; A47G 33/12; B60R 7/02; E05B 35/105; E05B 37/0034
USPC ..................... 296/37.7, 37.1, 37.8; 312/333; 100/229 A; 224/539, 542; 62/344
See application file for complete search history.

(56) References Cited

U.S. PATENT DOCUMENTS

| | | | | |
|---|---|---|---|---|
| 884,428 A | | 4/1908 | Strong | |
| 1,927,922 A | * | 9/1933 | Crum | B60R 9/065 296/37.1 |
| 2,639,068 A | * | 5/1953 | Luby | B25H 5/00 224/311 |
| 3,868,903 A | * | 3/1975 | Montalbano | B30B 9/3064 100/100 |
| 3,995,927 A | * | 12/1976 | Stein | A47B 88/57 312/333 |
| 4,188,879 A | * | 2/1980 | Judd | B30B 9/3032 100/229 A |
| 4,440,461 A | * | 4/1984 | Powell | A47B 88/417 312/334.8 |
| 4,909,558 A | | 3/1990 | Roshinsky | |
| 4,911,296 A | | 3/1990 | Hart, Jr. | |
| 4,919,267 A | * | 4/1990 | Stoll | B65D 5/005 206/507 |
| 5,044,059 A | * | 9/1991 | De Giulio | A47B 88/90 211/151 |
| 5,125,710 A | | 6/1992 | Gianelo | |
| 5,469,999 A | | 11/1995 | Phirippidis | |

(Continued)

*Primary Examiner* — Kiran B Patel
(74) *Attorney, Agent, or Firm* — Vichit Chea; Price Heneveld LLP (57) ABSTRACT

A vehicle storage drawer includes a frame and a housing slidably attached to the frame with a central aperture defining a receptacle. At least one container is selectively engaged with the receptacle. The at least one container is selectively removable from the receptacle when the housing is in an outward position. The container is selectively secured within the receptacle when the housing is in an inward position.

14 Claims, 6 Drawing Sheets

(56) References Cited

U.S. PATENT DOCUMENTS

| | | | |
|---|---|---|---|
| 5,501,384 A | 3/1996 | Wisniewski | |
| 5,505,358 A * | 4/1996 | Haase | B60R 7/02 |
| | | | 224/277 |
| 5,551,558 A | 9/1996 | Bureau | |
| 5,584,412 A | 12/1996 | Wang | |
| 5,810,187 A * | 9/1998 | Woodring | B65D 67/02 |
| | | | 206/504 |
| 5,829,813 A * | 11/1998 | LaValle | B60R 7/02 |
| | | | 224/311 |
| 5,845,952 A * | 12/1998 | Albertini | B60R 11/06 |
| | | | 296/100.02 |
| 5,890,439 A | 4/1999 | McGunn | |
| 5,964,492 A * | 10/1999 | Lyon | B60R 9/00 |
| | | | 224/404 |
| 5,992,718 A * | 11/1999 | Zaranek | B60R 11/00 |
| | | | 224/282 |
| 6,011,999 A | 1/2000 | Holmes | |
| 6,042,206 A | 3/2000 | Bowyer et al. | |
| 6,056,177 A | 5/2000 | Schneider | |
| 6,109,053 A | 8/2000 | Strackbein et al. | |
| 6,176,559 B1 | 1/2001 | Tiramani et al. | |
| 6,328,366 B1 | 12/2001 | Foster et al. | |
| 6,520,514 B2 | 2/2003 | Clegg | |
| 6,546,598 B1 | 4/2003 | Nakanou et al. | |
| 6,572,168 B1 * | 6/2003 | Radstake | B60R 7/14 |
| | | | 224/311 |
| 6,619,770 B1 | 9/2003 | Drab et al. | |
| 6,659,525 B2 | 12/2003 | Delavalle et al. | |
| 6,752,304 B1 | 6/2004 | Hotary et al. | |
| 6,811,068 B2 | 11/2004 | Johnson | |
| 6,923,354 B2 * | 8/2005 | Axelson | B60R 9/00 |
| | | | 224/281 |
| 7,090,274 B1 * | 8/2006 | Khan | B60R 5/04 |
| | | | 296/37.14 |
| 7,172,232 B2 * | 2/2007 | Chiku | E05B 83/32 |
| | | | 296/24.34 |
| 7,195,147 B2 | 3/2007 | Price et al. | |
| 7,393,037 B2 * | 7/2008 | Hwang | B60R 7/02 |
| | | | 224/400 |
| 7,726,753 B2 * | 6/2010 | Bassi | F25D 23/067 |
| | | | 108/107 |
| 7,770,952 B2 | 8/2010 | Hanzel | |
| 7,802,833 B2 | 9/2010 | Boreanaz et al. | |
| 7,931,177 B2 | 4/2011 | Bohlke et al. | |
| 7,997,668 B2 * | 8/2011 | Lee | F25D 25/025 |
| | | | 312/331 |
| 8,100,281 B2 * | 1/2012 | Sands | A61L 2/26 |
| | | | 206/503 |
| 8,215,688 B2 * | 7/2012 | Hipshier | B60R 7/04 |
| | | | 296/24.34 |
| 8,444,198 B2 | 5/2013 | Pauken | |
| 8,651,351 B2 * | 2/2014 | Fowler | B60R 5/04 |
| | | | 224/281 |
| 8,733,122 B2 | 5/2014 | Lim et al. | |
| 8,827,387 B2 | 9/2014 | Grela | |
| 8,857,684 B1 * | 10/2014 | Calvert | B60R 11/06 |
| | | | 224/281 |
| 9,081,886 B2 | 7/2015 | Schifman et al. | |
| 2001/0022450 A1 * | 9/2001 | Delavalle | B60R 5/041 |
| | | | 296/37.1 |
| 2002/0105201 A1 * | 8/2002 | Melotik | B60R 5/041 |
| | | | 296/26.09 |
| 2006/0231716 A1 | 10/2006 | Liu et al. | |
| 2007/0068835 A1 * | 3/2007 | Buie | F41A 23/18 |
| | | | 206/373 |
| 2009/0045645 A1 * | 2/2009 | Bohlke | B60R 7/02 |
| | | | 296/37.5 |
| 2009/0096240 A1 * | 4/2009 | Hanzel | B60N 3/08 |
| | | | 296/37.8 |
| 2009/0212678 A1 | 8/2009 | Sung | |
| 2011/0259036 A1 * | 10/2011 | Lim | F25C 1/24 |
| | | | 62/344 |
| 2014/0097731 A1 * | 4/2014 | Grela | B25H 3/00 |
| | | | 312/237 |

* cited by examiner

MULTI-FUNCTION AUTOMOTIVE TRUNK STORAGE DRAWER

CROSS-REFERENCE TO RELATED APPLICATION

The present application is a divisional of U.S. patent application Ser. No. 14/160,662 filed Jan. 22, 2014, entitled MULTI-FUNCTION AUTOMOTIVE TRUNK STORAGE DRAWER, the entire disclosure of which is hereby incorporated herein by reference.

FIELD OF THE INVENTION

The present invention generally relates to trunk storage organizers, and more specifically, a modular trunk storage organizer having a plurality of insertable bins or containers.

BACKGROUND OF THE INVENTION

Many automobiles include a trunk compartment that is an undivided open space into which various items can be stored. Certain vehicles can include features such as hooks or dividers that separate the trunk space into smaller subcompartments. Many of these features typically have a single purpose and do not include multi-functional capabilities, wherein these conventional trunk organizers generally are not adaptable to various usage situations.

SUMMARY OF THE INVENTION

According to one aspect of the present invention, a vehicle trunk storage drawer includes a frame and a housing slidably attached to the frame with a central aperture defining a receptacle. At least one container is selectively engaged with the receptacle. The at least one container is selectively removable from the receptacle when the housing is in an outward position. The at least one container is selectively secured within the receptacle when the housing is in an inward position.

According to another aspect of the present invention, a storage drawer for a vehicle cargo area includes a housing slidably attached to a frame and operable between inward and outward positions. A container is selectively engaged with a receptacle defined within the housing. The container is secured within the receptacle when the housing is in the inward position. The container is selectively removable from the receptacle when the housing is in the outward position.

According to another aspect of the present invention, a vehicle storage drawer includes a plurality of nesting containers. A housing is slidably attached to a frame and includes an aperture defining a receptacle. The housing is operable between inward and outward positions. Each of the nesting containers is selectively secured in the receptacle when the housing is in the inward position and selectively removable from the receptacle when the housing is in the outward position.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
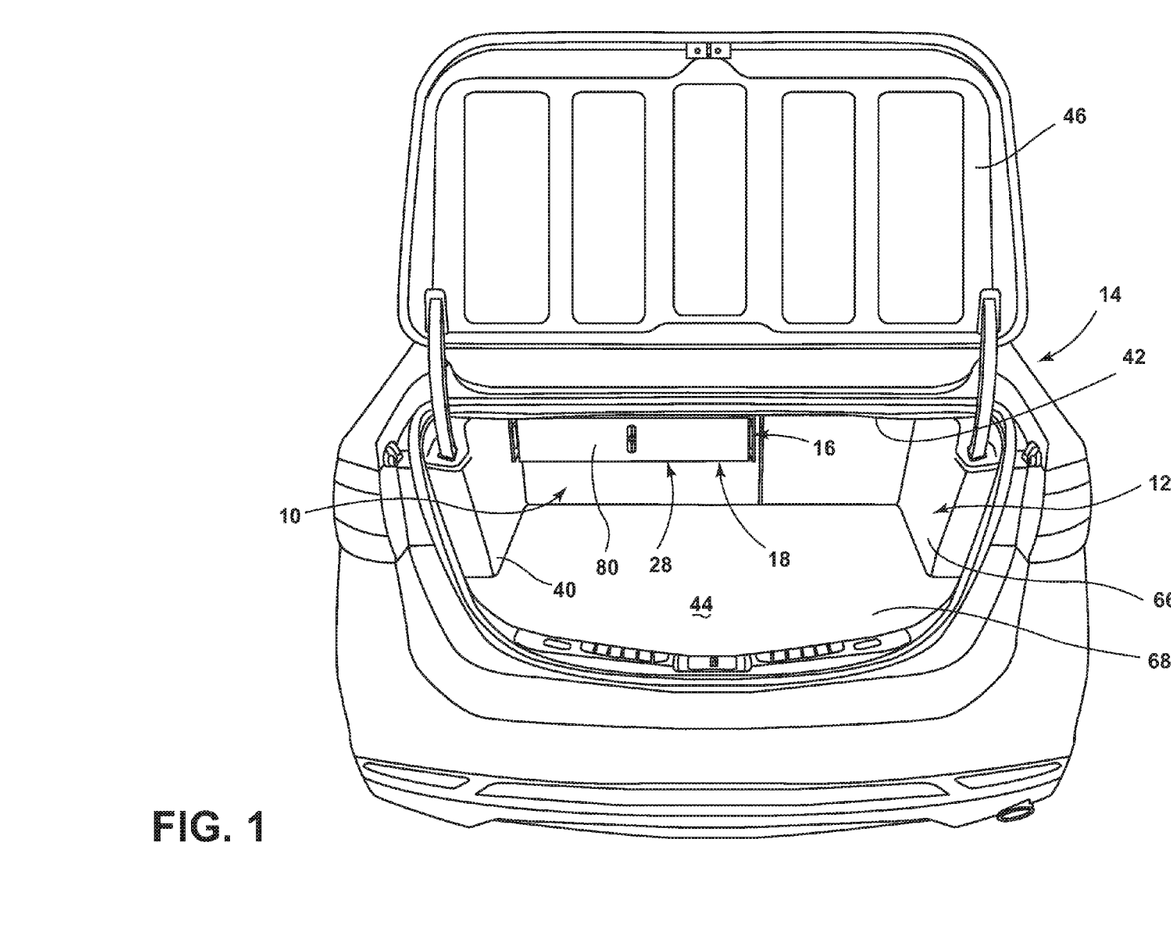
FIG. 1 is a rear top perspective view of a vehicle with an embodiment of the modular trunk drawer installed within the vehicle trunk with the drawer in a closed position.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 2:
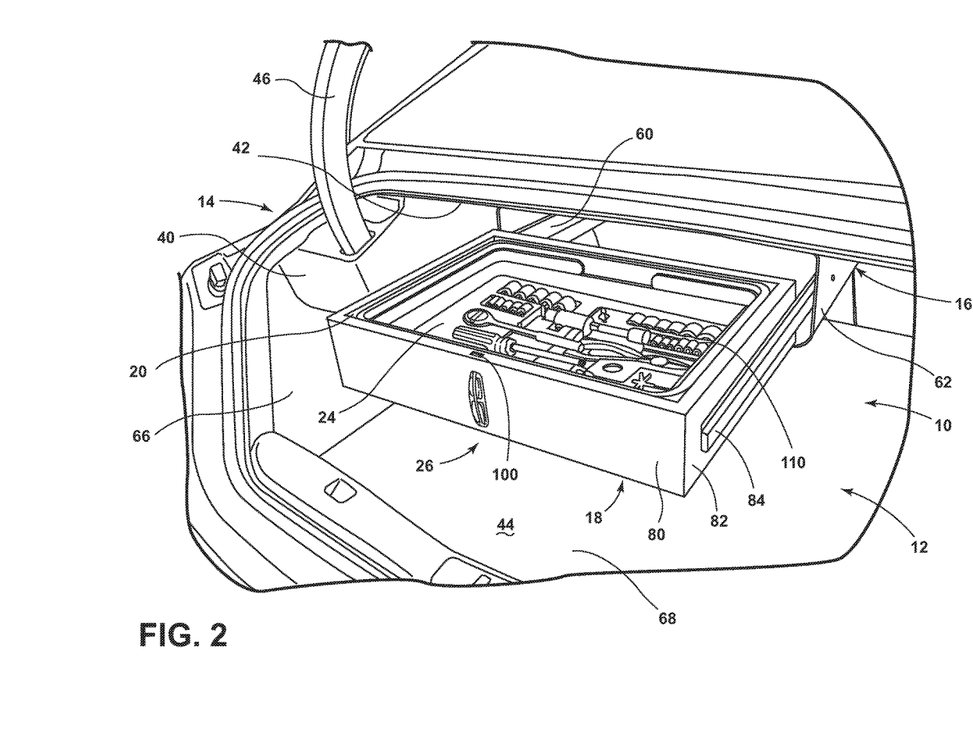
FIG. 2 is a detail rear top perspective view of the embodiment of FIG. 1 with the trunk drawer in an open position and the tool bin installed in the receptacle of the trunk drawer.

As shown in FIGS. 1 and 2, reference numeral 10 generally refers to a modular trunk drawer 10 shown installed within the trunk compartment 12 of a vehicle 14, according to one embodiment. The modular trunk drawer 10 includes a frame 16 and a housing 18 slidably attached to the frame 16, wherein the housing 18 has a central aperture 20 defining a receptacle 22. At least one container 24 is selectively engaged with the receptacle 22. The at least one container 24 is selectively removable from the receptacle 22 when the housing 18 is in an outward position 26, and the at least one container 24 is selectively secured within the receptacle 22 when the housing 18 is in an inward position 28.

Referring again to FIGS. 1 and 2, the modular trunk drawer 10 is installed within the trunk compartment 12 of a vehicle 14, and the frame 16 of the modular trunk drawer 10 is attached to one of the structural panels 40 of the trunk 12. Typically, the frame 16 is attached to the top panel 42 of the trunk 12 such that the modular trunk drawer 10 can be elevated above the bottom surface 44 of the trunk 12. In this manner, the modular trunk drawer 10 does not substantially interfere with the placement and removal of items within the modular trunk drawer 10 that are not positioned within the modular trunk drawer 10. It is contemplated that the modular trunk drawer 10 is to be installed proximate the trunk hatch 46, such that when the modular trunk drawer 10 is moved to the outward position 26, the various containers 24 disposed within the receptacle 22 of the housing 18 can be easily inserted within and removed from the receptacle 22. With the modular trunk drawer 10 disposed near the trunk hatch 46, when the modular trunk drawer 10 is in the inward position 28, the one or more containers 24 that are disposed within the receptacle 22 are substantially secured within the receptacle 22 between the modular trunk drawer 10 and the top panel 42 of the trunk 12. In this manner, the one or more containers 24 that are disposed within the receptacle 22 are substantially secured within the receptacle 22 when the modular trunk drawer 10 is in the inward position 28.

Referring now to the embodiment of FIGS. 1-5, the frame 16 of the modular trunk drawer 10 includes one or more slidable guide rails 60 that engage the housing 18, such that the housing 18 is slidably engaged with the frame 16 and operable between the outward and inward positions 26, 28. The slidable guide rails 60 are disposed upon vertical flanges 62 of the frame 16 that are disposed on either side of the housing 18. The frame 16 also includes attachment flanges 64 that are configured to engage the frame 16, and in turn the modular trunk drawer 10, with a portion of the trunk structural panels 40, as described above. It is contemplated that in various embodiments, the frame 16 of the modular trunk drawer 10 can be configured such that the attachment flanges 64 of the frame 16 allow for installation of the modular trunk drawer 10 to a side panel 66, base panel 68, or other structural surface within the trunk compartment 12.

Figures 3, 4:
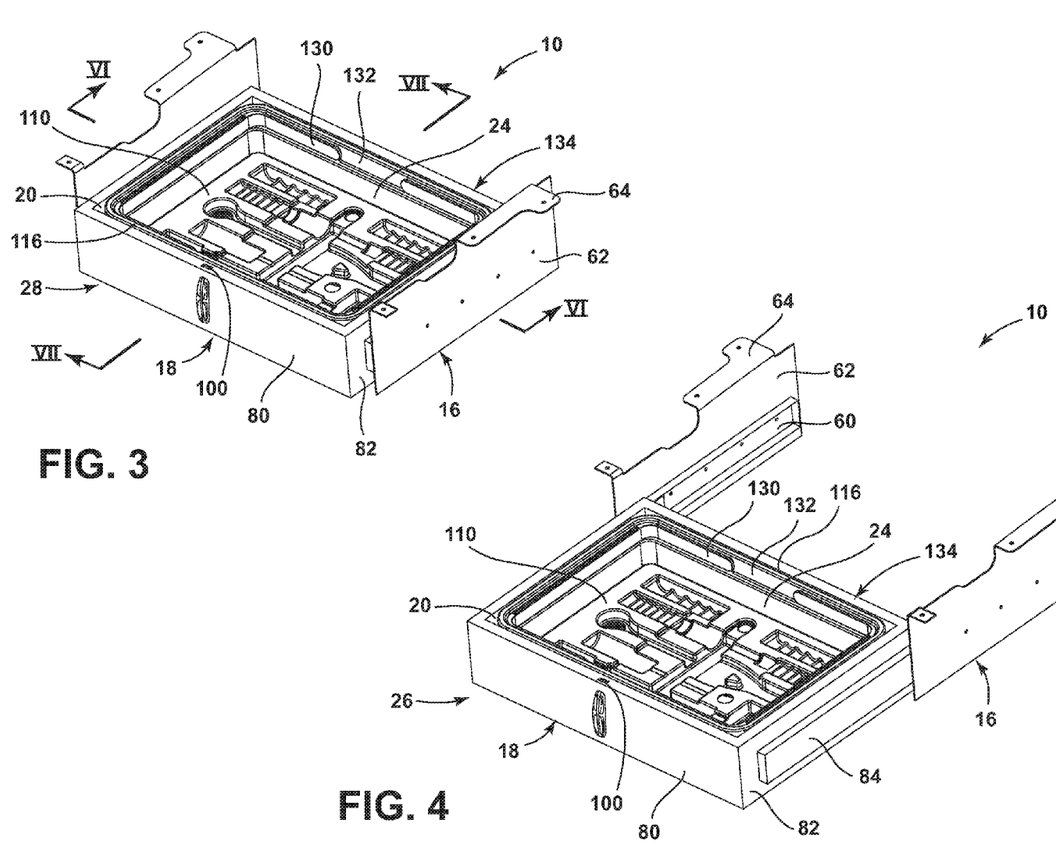
FIG. 3 is a top perspective view of the modular trunk drawer removed from the vehicle trunk and with the drawer in a closed position.
FIG. 4 is a top perspective view of the embodiment of FIG. 3 with the modular trunk drawer in an open position.
Figure 5:
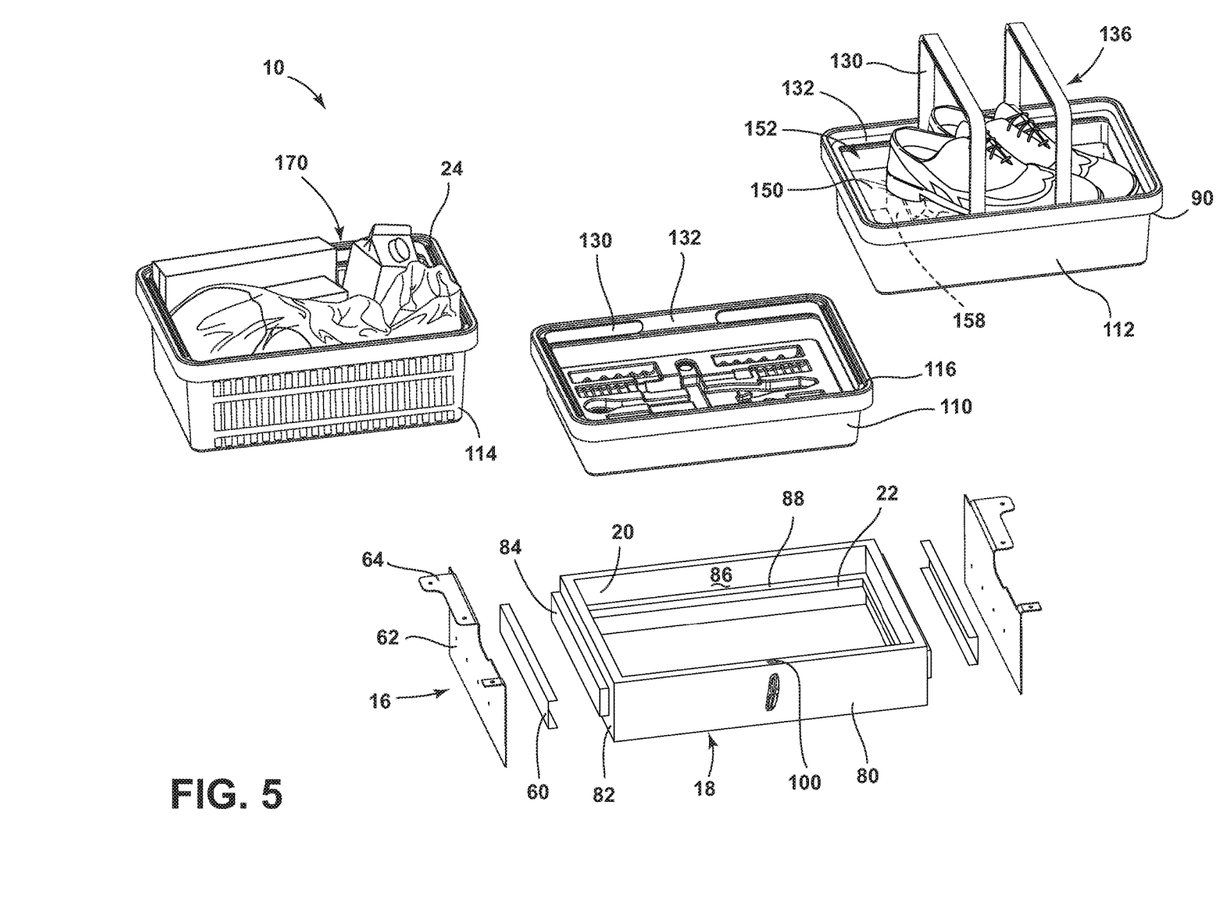
FIG. 5 is an exploded top perspective view of the modular trunk drawer.
Figure 6:
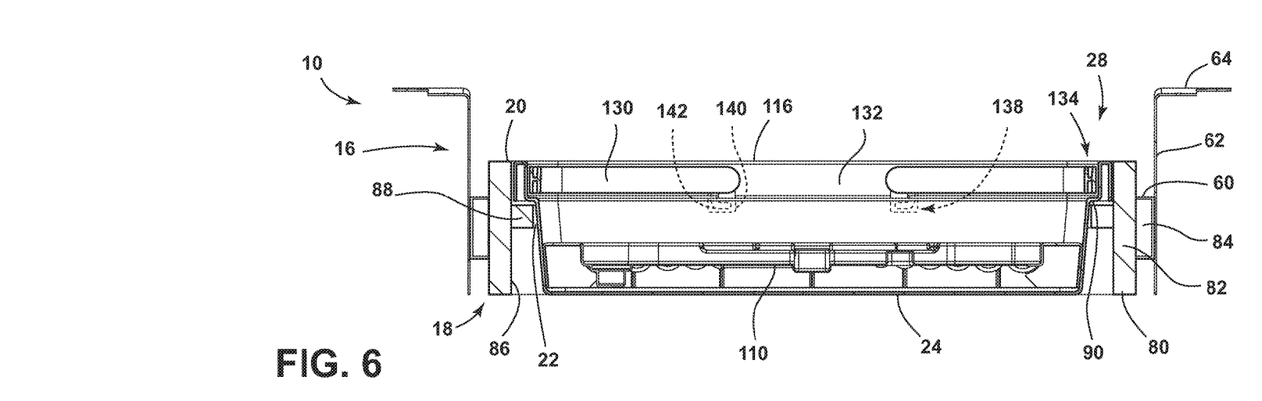
FIG. 6 is a cross-sectional view of the embodiment of FIG. 3 taken along line VI-VI.

Referring now to the embodiment of FIGS. 3-5, the housing 18 of the modular trunk drawer 10 includes outer framing members 80, wherein the two side framing members 82 include guide rail supports 84 that cooperate with the slidable guide rails 60 attached to the frame 16 of the modular trunk drawer 10 to allow the housing 18 to slidably engage the frame 16. The outer framing members 80 of the housing 18 define the central aperture 20 that forms the receptacle 22 of the housing 18. In various embodiments, the housing 18 can include a base member that further defines the central aperture 20 and the receptacle 22 of the housing 18. It is contemplated that the inner surface 86 of the outer framing members 80 includes an inner tab 88 that is configured to receive and support an outer lip 90 of each of the containers 24 when installed within the receptacle 22.

Referring again to FIGS. 1 and 2, the modular trunk drawer 10 can include a locking mechanism 100 that is configured to selectively secure the housing 18 in the position within the frame 16. In this manner, the housing 18 of the modular trunk drawer 10 can be prevented from inadvertently moving to the outward position 26, such as during use of the vehicle 14, or when the vehicle 14 is on an inclined surface that causes the housing 18 to slide into the outward position 26. The locking mechanism 100 can include a detent portion of the sliding guides that defines an interference fit between the housing 18 and the frame 16, when the housing 18 is disposed in the inward position 28. In such an embodiment, the detent would substantially prevent unwanted movement of the housing 18 to the outward position 26, but would also allow the user to pull the housing 18 toward the outward position 26 when desired. It is also contemplated that the locking mechanism 100 can be a locking feature that engages the housing 18 to either the frame 16, or a portion of the trunk compartment 12 that can be engaged to secure the housing 18 within the inward position 28, and disengaged to allow for movement of the housing 18 to the outward position 26, so that one of the containers 24 can be removed from or placed within the receptacle 22 of the housing 18. Such locking features can include, but are not limited to, latches, hasps, clasps, pins, tabs, or other similar interference mechanisms. The locking mechanism 100 can also include a conventional locking mechanism that can be operated by a key, wireless remote, combination, voice command, through a vehicle 14 interface, key fob, or other similar locking mechanisms.

Referring now to the embodiment of FIGS. 4-7, the modular trunk drawer 10 can include one or more containers 24 wherein each of the containers 24 is alternatively and selectively received by the receptacle 22. The various containers 24 of the modular trunk drawer 10 can include a first bin, such as a tool bin 110, a second bin, such as a utility bin 112, and a third bin, such as a storage bin 114. Each of these containers 24 can be alternatively disposed within the receptacle 22 of the housing 18, depending upon the needs of the user in storing various items. Each of the containers 24 includes an outer lip 90 that is disposed at a rim 116 of each of the containers 24. This outer lip 90 is configured to engage the receptacle 22 of the housing 18 at the inner tab 88 positioned at the central aperture 20 of the housing 18. In this manner, when the container 24 is disposed within the receptacle 22, the outer lip 90 of the container 24 engages the inner tab 88 of the receptacle 22 to vertically support the container 24 within the receptacle 22. The inner tab 88 of the receptacle 22 can include a continuous protrusion that extends around the inner perimeter of the central aperture 20, or can be a series of protrusions spaced around the inner perimeter of the aperture. In various embodiments, the inner tab 88 of the receptacle 22, the outer lip 90 of the containers 24, or both, can include various latching or engaging features that are configured to substantially secure the container 24 within the receptacle 22 during use or storage.

Referring again to FIGS. 2-7, each of the containers 24 can include one or more handles 130 that are coupled to the container 24 proximate the rim 116. In various embodiments, the rim 116 can include an inner contour 132 that is configured to receive the handles 130 of the container 24 when the handles 130 are disposed in a stowed position 134. When it is necessary to lift one of the containers 24, the handles 130 can be rotated from the stowed position 134 within the inner contour 132 of the container 24 to an upright position 136 above the container 24, such that the user can lift the container 24 for use. It is contemplated that the container 24 can include one or a plurality of handles 130. Smaller containers 24 of the modular trunk drawer 10 designed for carrying smaller, more lightweight items, can include a single handle 130, wherein larger containers 24 of the modular trunk drawer 10 configured to hold larger items or more items can be configured to have a plurality of handles 130 for additional structural support in carrying the container 24.

Figure 7:
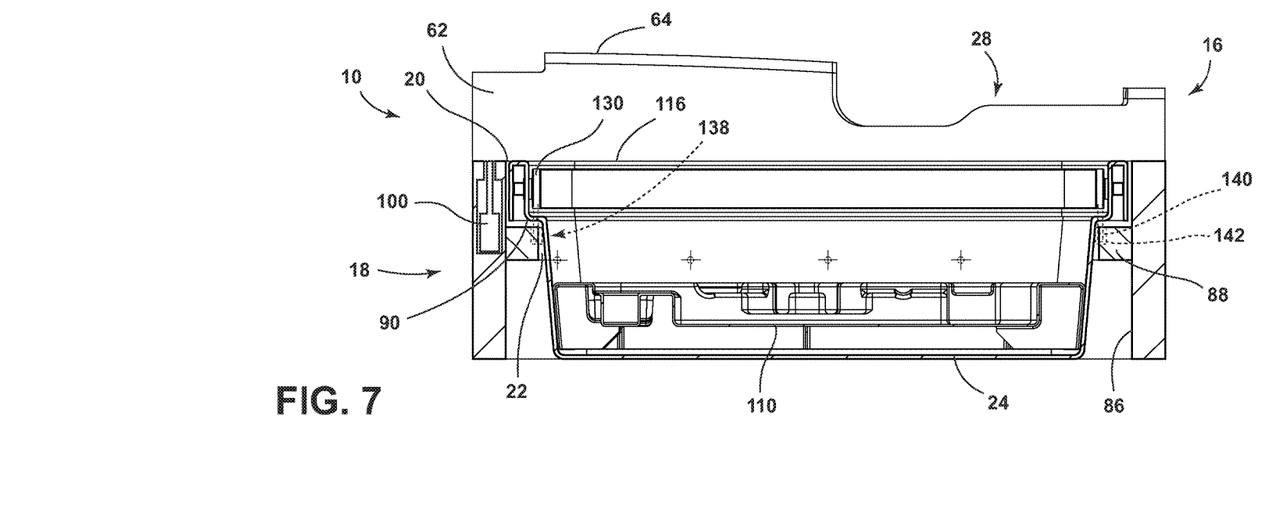
FIG. 7 is a cross-sectional view of the embodiment of FIG. 3 taken along line VII-VII.
Figure 8:
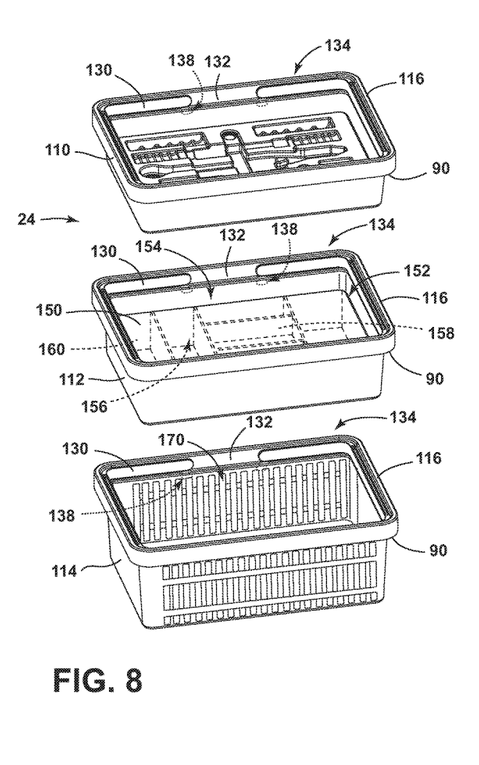
FIG. 8 is a partially exploded perspective view of the bins of the modular trunk drawer in a nesting-type configuration.

As shown in the embodiment of FIGS. 7 and 8, the handles 130 can include a securing mechanism 138 that substantially secures the container 24 to the inner tab 88 of the receptacle 22 when the container 24 is within the receptacle 22 and the handles 130 are in the stowed position 134. In such an embodiment, the handle 130 can include a latch 140 or hook that engages a recess 142 defined within the housing 18 or the inner tab 88 of the housing 18. When the handle 130 is moved to the stowed position 134, the latch 140 or hook of the handle 130 is configured to engage the recess 142 of the inner tab 88 and substantially secure the container 24 within the receptacle 22. It is contemplated that other similar securing mechanisms 138 can be disposed within the handle 130, the housing 18, or both.

Figure 9:
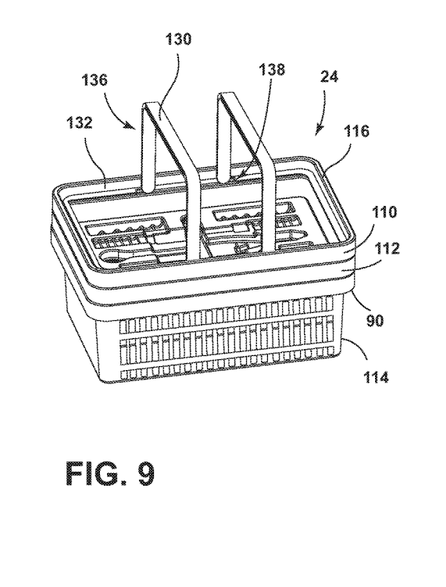
FIG. 9 is a top perspective view of the embodiment of FIG. 8 with the bins shown stacked in a nesting-type configuration.

Referring now to FIGS. 8 and 9, the utility bin 112 of the modular trunk drawer 10 can include a selectively removable medial platform 150 that separates the interior volume 152 of the utility bin 112 into upper and lower portions 154, 156. In various embodiments, at least one inner wall 158 can be disposed within the lower portion 156 of the utility bin 112 to divide the lower portion 156 of the interior volume 152 into a plurality of sub-compartments 160 within the lower portion 156 of the utility bin 112. It is contemplated that the medial platform 150 of the utility bin 112 is positioned such that, in various embodiments, the tool bin 110 can be disposed within the upper portion 154 of the utility bin 112 in a nesting-type configuration.

Referring again to FIGS. 8 and 9, the tool bin 110, the utility bin 112, and the storage bin 114 are configured to engage one another in a nesting-type configuration, such that the tool bin 110 can fit within the upper portion 154 of the utility bin 112, and the utility bin 112 can fit within the inner volume 170 of the storage bin 114. It is contemplated that the outer lip 90 of each of the bins can include a similar perimeter dimension such that the outer lip 90 of the tool bin 110 rests upon the outer lip 90 of the utility bin 112 and the outer lip 90 of the utility bin 112 rests upon the outer lip 90 of the storage bin 114. Alternatively, the outer lip 90 of each of the containers 24 can include a progressively smaller perimeter dimension, such that the tool bin 110 can fit within the utility bin 112, and the utility bin 112 can fit within the storage bin 114. In this manner, when stored in the nesting-type configuration, the tool bin 110 and utility bin 112 can be stored substantially within the inner volume 170 of the storage bin 114. In such an embodiment, the storage bin 114 can include an inner ledge that is configured to receive the outer lip 90 of the utility bin 112. Similarly, the utility bin 112 can include an inner ledge that is configured to receive the outer lip 90 of the tool bin 110. In the various embodiments, it is contemplated that, when not in use, the tool bin 110, the utility bin 112, and the storage bin 114 can be nested within one another and placed within the receptacle 22 of the housing 18 for storage when the containers 24 are not in use.

In various embodiments, the various containers 24 can be alternatively disposed within the receptacle 22 of the housing 18 to be secured within the receptacle 22 for use. It is contemplated that the frame 16 of the modular trunk drawer 10 can include retention features for substantially securing one or more of the containers 24 when not in use and when not secured within the receptacle 22 of the housing 18. Such retention features can include, but are not limited to, hooks, latches, tabs, or other similar interference or securing mechanisms 138 that are configured to substantially secure one or more of the containers 24 proximate the frame 16.

It is contemplated that one more of the containers 24 can be configured to be collapsible by folding, dismantling, telescoping or other similar method, such that the walls of the container 24 can fold upon one another. In this manner, the container 24 can be folded into a smaller shape for convenient storage within the modular trunk drawer 10, one of the other containers 24, or elsewhere in the trunk 12.

In the various embodiments, the housing 18 and the frame 16 of the modular trunk drawer 10 can be made of a substantially rigid and sturdy material that can include, but is not limited to, metal, plastic, composite, combinations thereof, or other similar and substantially rigid and sturdy material. The containers 24 of the modular trunk drawer 10 can be made of a substantially rigid and lightweight material that can include, but is not limited to, metal, plastic, composite, combinations thereof, and other similar substantially sturdy and lightweight materials that are configured to allow for the convenient use and carrying of each of the containers 24.

It is contemplated that the modular trunk drawer 10, as described above, can be installed within the trunk compartment 12 of a vehicle 14. It is also contemplated that the modular trunk drawer 10 can be installed within other types of vehicles within interior cargo areas. Such vehicles can include, but are not limited to, SUVs, CUVs, cargo vehicles, and others. Additionally, the modular trunk drawer 10 can also be installed within exterior portions of the vehicle 14, such as the bed of a pick-up truck, or on the underside of the vehicle 14. In embodiments where the modular trunk drawer 10 is disposed on the underside of a vehicle 14, containers 24 having a lower profile may be used. Additionally, the housing 18 can include a bottom panel that is configured to prevent fluid, debris, and other material from entering the housing 18 during use of the vehicle 14.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle trunk storage drawer comprising:
   a plurality of nesting containers; and
   a housing slidably attached to a frame and including an aperture defining a receptacle, wherein the housing is operable between inward and outward positions, and wherein each of the nesting containers is selectively secured in the receptacle when the housing is in the inward position and selectively removable from the receptacle when the housing is in the outward position.

2. The vehicle storage drawer of claim 1, wherein the receptacle includes an inner tab positioned proximate the central aperture and wherein each container of the plurality of nesting containers includes an outer lip disposed proximate a rim of each container, wherein the outer lip engages the inner tab to selectively secure at least one of the nesting containers within the receptacle.

3. The vehicle trunk storage drawer of claim 1, wherein the frame includes an attachment flange configured to secure the frame to an inner surface of a vehicle trunk.

4. The vehicle storage drawer of claim 3, wherein the attachment flange is positioned above the receptacle and the attachment flange is attached to a top panel of the vehicle trunk.

5. The vehicle trunk storage drawer of claim 1, wherein the plurality of nesting containers includes a first container which is selectively positioned within a second container and the second container is selectively positioned within a third container, and wherein the third container is selectively disposed in the receptacle.

6. The vehicle storage drawer of claim 5, wherein the second container of the plurality of nesting containers includes a selectively removable medial platform that defines upper and lower portions of an interior volume of the second container, and wherein the first container is selectively positioned within the upper portion, and wherein the second container includes at least one inner wall that defines a plurality of sub-compartments within the lower portion.

7. The vehicle trunk storage drawer of claim 2, wherein each of the plurality of containers includes at least one handle that is operable between an upright position and a stowed position proximate the rim of the respective container.

8. The vehicle trunk storage drawer of claim 1, further comprising:
   a locking mechanism disposed proximate the housing to selectively secure the housing in the inward position within the frame.

9. The vehicle trunk storage drawer of claim 1, wherein each of the plurality of nesting containers includes a respective container handle, and wherein when at least one of the plurality of nesting containers is selectively secured in the receptacle and the respective container handle is in a stowed position, the at least one of the plurality of nesting containers secured in the receptacle is secured therein in both of the inward and outward positions, and wherein each of the plurality of nesting containers is adapted to be alternately and selectively received by the receptacle.

10. The vehicle trunk storage drawer of claim 1, wherein each container of the plurality of nesting containers fully occupies the receptacle when engaged with the receptacle.

11. The vehicle trunk storage drawer of claim 5, wherein the first container is a tool bin that is adapted to be selectively disposed within at least one of the second container, the third container and the receptacle.

12. The vehicle trunk storage drawer of claim 6, wherein the interior volume of the second container is adjustable to define a plurality of configurations, wherein the removable medial platform and the at least one inner wall are adjustable to define the plurality of sub-compartment configurations, and wherein the second container is adapted to be selectively disposed within at least one of the third container and the receptacle.

13. The vehicle trunk storage drawer of claim 2, wherein the inner tab of the receptacle is defined by a continuous protrusion that extends around an inner perimeter of the central aperture.

14. The vehicle trunk storage drawer of claim 7, wherein the at least one handle includes a pair of opposing handles, and wherein the rim of each of the plurality of nesting containers includes an inner contour that receives the pair of opposing handles in the stowed position.

* * * * *